United States Patent [19]

Obrist

[11] Patent Number: 4,815,780

[45] Date of Patent: Mar. 28, 1989

[54] APPARATUS FOR DETACHABLY CONNECTING A TOOL TO A MANIPULATING DEVICE

[75] Inventor: Basil Obrist, Lenzburg, Switzerland

[73] Assignee: Erowa AG, Reinach, Switzerland

[21] Appl. No.: 171,756

[22] Filed: Mar. 22, 1988

[30] Foreign Application Priority Data

Mar. 30, 1987 [DE] Fed. Rep. of Germany ....... 3710472

[51] Int. Cl.[4] ............................................. B66C 1/10
[52] U.S. Cl. ................... 294/86.4; 294/87.28; 294/82.24; 414/730; 403/322; 403/325; 901/28; 901/37; 901/41
[58] Field of Search ................ 294/86.4, 82.28, 82.24, 294/906, 88, 82.32; 414/730, 729, 735; 901/27, 28, 29, 41, 42, 43; 403/322, 325, 328; 81/177.85

[56] References Cited

U.S. PATENT DOCUMENTS

| | | | |
|---|---|---|---|
| 4,227,853 | 10/1980 | Woodford et al. | 403/332 |
| 4,370,091 | 1/1983 | Gagliardi | 901/29 |
| 4,500,065 | 2/1985 | Hennekes et al. | 901/41 |
| 4,636,135 | 1/1987 | Baneon | 294/82.28 |

Primary Examiner—James B. Marbert
Attorney, Agent, or Firm—Tarolli, Sundheim & Covell

[57] ABSTRACT

The invention provides an apparatus for detachably connecting a tool to a manipulating device, e.g. an industrial robot. The apparatus includes a tool holder and a coupling member fastened to the robot. The coupling member has a free frontal surface on which the tool holder rests. A plurality of air channels and electric contacts merge into the free frontal surface in a peripheral region thereof. Four projecting centering pins are provided in the center of the free frontal surface. The tool holder is provided with correspondingly located air channels and electric contacts as well as with a centrally arranged centering disc which is rigid in circumferential direction and axially resilient. The disc has apertures in which the centering pins enter when the tool holder is fixed to the coupling member. Thus, the tool holder is precisely centered and all pneumatic and electric connections are automatically established.

10 Claims, 5 Drawing Sheets

APPARATUS FOR DETACHABLY CONNECTING A TOOL TO A MANIPULATING DEVICE

BACKGROUND OF THE INVENTION

1. Field of the Invention

The present invention relates to an apparatus for detachably connecting a tool to a manipulating device, comprising a tool holder and a coupling member mounted on the manipulating device, whereby the tool holder and the coupling member each include locking means to detachably connect the tool holder to the coupling device by a positive interlocking. Particularly, the invention relates to an apparatus of the kind referred to above which can be used as an interface for exchangeably mounting pneumatically and/or electrically operated tools on an industrial robot.

Automatically operating and computer-controlled manipulating devices gain an increasing importance in the field of manufacturing and handling of workpieces, particularly in series production, for instance in the field of mounting or assembling of various devices and parts, in the field of placing electric and electronic components on a printed circuit board or a similar substrate etc. Such manipulating devices usually comprise a tool holder on which a tool is mounted which can be moved, within certain constructional limits, in several degrees of freedom and which serve to treat the workpiece. It should be pointed out in this connection that the expression "tool" shall be understood in its broadest sense; not only working tools like drilling machines, power operated screw drivers etc. are meant, but also gripping pliers, vacuum grippers, means for applying adhesive to a workpiece, measuring and test instruments, loading and unloading devices for workpiece pallets etc.

As long as such a manipulating device has to meet only one job, e.g. taking a part out of a magazine and putting it into a workpiece which passes the manipulating device, the mounting of a tool suitable for this job on the arm of the manipulating device does not present any problems. However, if only comparatively small series have to be treated, or if a certain manipulating device has to meet several different jobs, it should be made sure that a rapid tool exchange without any problems can be performed, if possible in a fully automatic manner.

2. Prior Art

For this purpose, an apparatus is disclosed in U.S. Pat. No. 4,636,135 which comprises a coupling member mounted on the arm of a robot and a tool holder which can be positively locked in the coupling member and which is detachable from the coupling member. Since many tools, e.g. gripping pliers, are pneumatically or electrically operated, the coupling member is provided with a connection for pressurized air communicating with an air outlet provided in the tool holder as soon as the latter one is connected to the coupling member. Furthermore, the coupling member and the tool holder are provided with electric connectors adapted to engage upon mounting the tool holder on the coupling member. Thus, it is possible to prepare the tool holder by mounting e.g. an pneumatically or electrically operated tool on the tool holder in advance and to establish the required air and/or electric connection between tool and tool holder.

However, two problems can not or only partly be solved with the apparatus according to the above mentioned U.S. Pat. No. 4,636,135: On the one hand, such an apparatus is not universally usable but is suited only for such pneumatically operated tools which require only a single air supply connection. Further connections, e.g. an additional connection for the supply of pressurized air or a connection to a vacuum source have to be realized in addition; this results in the fact that such an apparatus is not suitable for an automatic tool exchange. On the other hand, the positioning accuracy, particularly the repetitive positioning accuracy, of the tool holder with respect to the coupling member and, thus, to the manipulating device is not satisfactory. Because manipulating devices according to the latest state of the art are able to be operated within a preset target range of 0.05 mm, even if the arm of the manipulating device has to be returned to the same target position repetitively, it is very important that the position of the tool with respect to the arm of the manipulating device is exactly defined and maintained also after an automatic tool exchange. This is of primary importance if the manipulating device effects a plurality or a series of different operations whereby the tool must be exchanged after each operation.

OBJECTS OF THE INVENTION

It is an object of the invention to avoid the aforementioned disadvantages and to improve an apparatus of the above mentioned kind such that it can be used for nearly every tool to be operated with a manipulating device.

It is a further object of the invention to provide an apparatus of the kind referred to which is well suited for an automatic tool exchange and to avoid the need to manually establish additional air or electric connections after the tool has been exchanged.

It is a still further object of the invention to provide an apparatus in which the position of the tool with respect to the arm of the manipulating device is exactly defined and in which this exactly defined position is maintained even if the tools are frequently exchanged and even if the tool holder and/or the coupling member are worn out due to a frequent exchange of the tools.

SUMMARY OF THE INVENTION

The present invention provides an apparatus for detachably connecting a tool to a manipulating device, comprising a tool holder and a coupling member mounted on the manipulating device. Both the tool holder and the coupling member each include locking means to detachably connect the tool holder to the coupling device by a positive interlocking.

The coupling member has a freely exposed frontal surface on which the tool holder rests upon connecting thereof to the coupling member.

In order to automatically establish the air and electric connection between the coupling member and the tool holder, the coupling member comprises a plurality of channels merging into the freely exposed frontal surface and a plurality of electric contact members, the ends thereof being located in the region of the freely exposed frontal surface.

In order to make sure that the tool holder is exactly positioned with respect to the coupling member, the latter comprises a plurality of centering pins projecting beyond the freely exposed frontal surface and having a conically tapered head portion, whereby said centering pins are located adjacent to the freely exposed frontal surface.

In addition, the tool holder comprises a surface portion adapted to rest on the freely exposed frontal surface of the coupling member upon connecting the tool holder to said coupling member by means of said locking means. The surface portion of the tool holder is equipped with a plurality of channels correspondingly located with respect to said channels in the coupling member and with a plurality of electric contacts correspondingly arranged with respect to said electric contact members provided in the coupling member.

Still further, the tool holder comprises a disc-shaped centering member mounted on its surface portion which is axially resilient but rigid in circumferential direction. The centering member has a plurality of apertures correspondingly located with respect to the centering pins on the coupling member which at least partially engage the conically tapered head portion of the centering pins upon connecting the tool holder to the coupling member.

Thus, it is achieved that, the tool holder being mounted and locked, all electric and pneumatic connections between manipulating device and tool are automatically established since the tool holder rests with its surface portion, including all pneumatic and electric connections to which the pre-mounted tool is connected, on the freely exposed frontal surface of the coupling member which incorporates the pneumatic channels and the electric contact members. Furthermore, the cooperation of the conically tapered centering pins of the coupling member and the centering apertures of the axially resilient centering disc on the tool holder ensures that the tool holder and, therewith, the tool is not only exactly positioned with respect to the central axis of the manipulating device, but also with respect to the angle around said central axis.

In a preferred embodiment of the apparatus of the invention, the coupling member further comprises a plurality of electromagnetic valves, each of said electromagnetic valves being associated with one of the channels in the coupling member, whereby the inlet of at least some of the electromagnetic valves is connected to a first source of pressurized air, the inlet of at least one of the electromagnetic valves is connected to a second source of pressurized air and the inlet of at least one of the electromagnetic valves is connected to a vacuum source. This design renders the apparatus of the invention most useful to be combined with a great number of different kinds of tools.

Preferably, the electric contact members of the coupling member comprise axially resiliently mounted pins, the tips thereof slightly standing back with respect to the freely exposed frontal surface of the coupling member to ensure a good electric connection and to avoid the danger of short circuits.

A very high positional accuracy can be realized if the coupling member comprises four centering pins symmetrically located on a portion of the frontal surface of the coupling member which stands back with respect to said freely exposed frontal surface of the coupling member. These pins cooperate with the apertures in the disc-shaped centering member which is centrally mounted on the tool holder. Preferably, the disc-shaped centering member has somewhat smaller size than the tool holder whereby said plurality of channels and said plurality of electric contacts are located along the periphery of the tool holder which preferably has the form of a symmetric, plate-shaped body. In order to ensure that the disc-shaped centering member can be resiliently deformed in axial direction, the plate-shaped body of the tool holder comprises a plurality of recesses in its surface which are congruently located with respect to said apertures in the disc-shaped centering member.

BRIEF DESCRIPTION OF THE DRAWINGS

In the following, a preferred embodiment of the apparatus according to the invention will be further described, with reference to the accompanying drawings.

DESCRIPTION OF A PREFERRED EMBODIMENT

Figure 1:
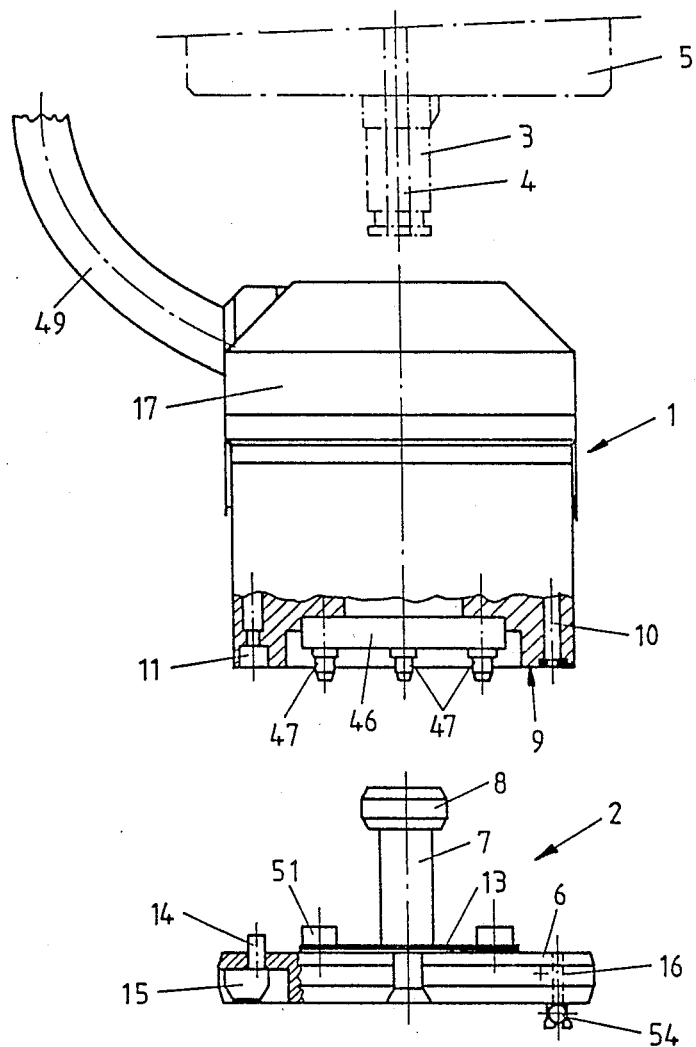
FIG. 1 shows a schematic, partionally sectioned side view of the apparatus according to the invention in a disassembled condition.

According to FIG. 1, the apparatus of the invention generally consists of a coupling member 1 and a tool holder 2. The coupling member 1 is designed to be mounted on a shaft 3 at the end of an arm 5 of a robot. The shaft 3 is equipped with an air channel 4 serving to supply pressurized air to the coupling member 1. The tool holder 2 includes a mounting plate 6 on which a (not shown) tool, e.g. a pneumatically operated gripper or a similar tool can be mounted.

The mounting plate 6 comprises a centrally located locking pin 7 which projects from the surface of the plate 6 in perpendicular direction; this locking pin serves to connect the mounting plate 6 to the coupling member 1. For this purpose, the locking pin 7 is provided with a head portion 8 adapted to be received in a matchingly designed bore in the coupling member 1. Further details relating to the connection of the tool holder 2 to the coupling member 1 will be given hereinafter with reference to FIG. 3.

The coupling member 1 comprises a surface portion 9 extending along the periphery of the coupling member 1 and being freely exposed. Said surface portion 9 comprises, on the one hand, air channels 10 and, on the other hand, electric contact members 11. Both the air channels 10 and the electric contact members 11 merge into and end at, respectively, the surface portion 9. In the center of the freely exposed frontal surface of the coupling member 1, four projecting centering pins 47 are provided in a symmetric arrangement which cooperate with a centering disc 13 mounted on the tool holder 2. The mounting plate 6 of the tool holder 2 is provided, on the one hand, with electric contacts 14 wired to connecting terminals 15 and, on the other hand, with air channels 16. The electric contacts 14 as well as the air channels 16 are located along the periphery of the mounting plate 6. Furthermore, the location of the electric contacts 14 and of the air channels 16 correspond to the location of the electric contact members 11 and the air channels 10 of the coupling member 1 if the tool holder 2 is connected the coupling member 1.

Figure 2:
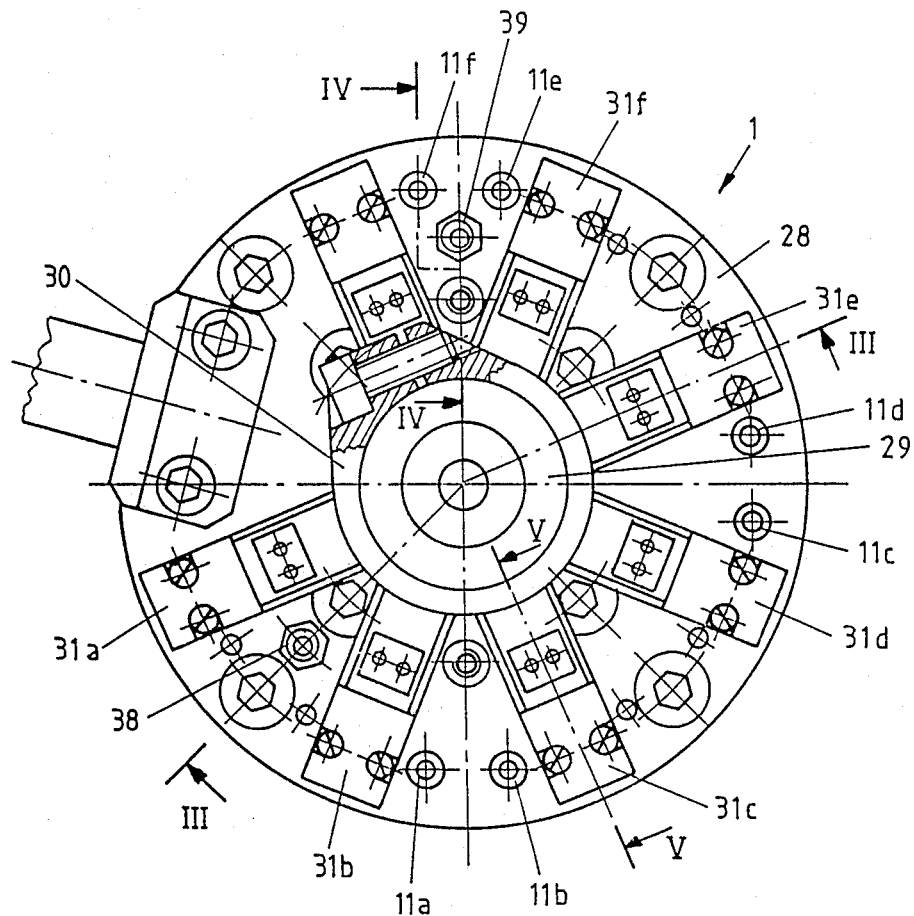
FIG. 2 is a top view of the coupling member with removed cover.
Figure 3:
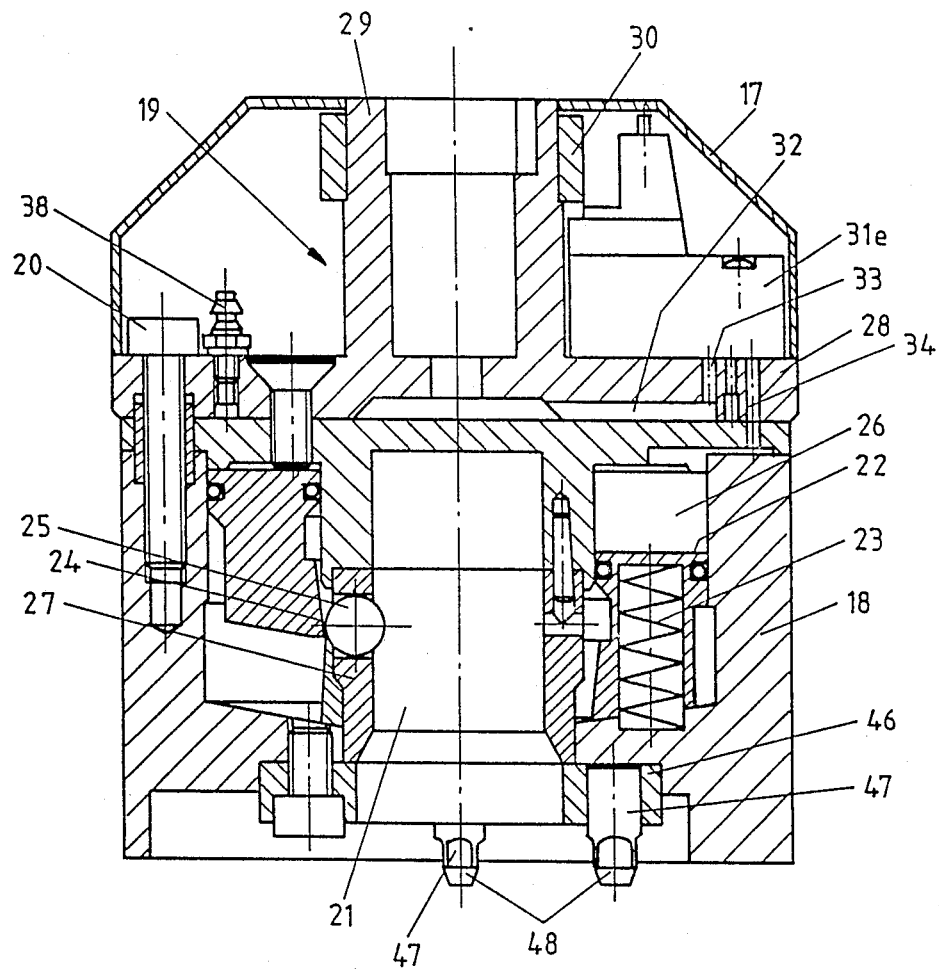
FIG. 3 is a sectional view along the line III—III in FIG. 2.
Figure 4:
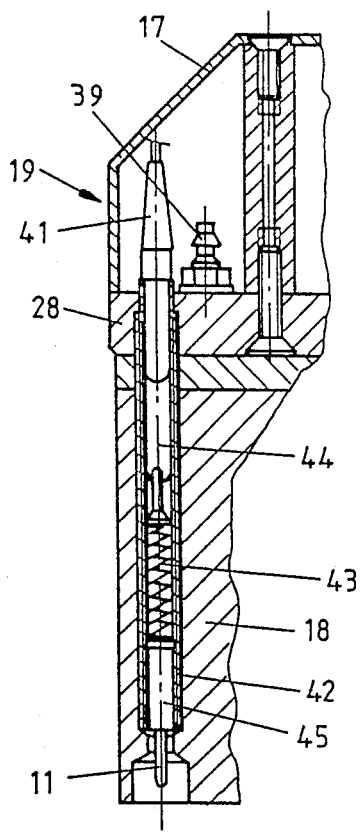
FIG. 4 is a sectional view along the line IV—IV in FIG. 2.

FIG. 2 shows a top view of the coupling member 1 with removed cover 17 (FIG. 1), and FIG. 3 shows a sectional view along the line III—III in FIG. 2. The coupling member 1 essentially consists of a coupling body 18 and a connecting body 19, both of them being of circular shape and rigidly fastened to each other by means of screws 20. The coupling body 18 comprises a central bore 21 adapted to receive the locking pin 7 and the head portion 8 of the tool holder 2. An annular piston 22 is concentrically located with respect to the bore 21 and axially displaceable; springs 23 are provided to urge the piston 22 into its upper end position. Thereby, chamfered side surfaces 24 of the annular piston 22 displace balls 25, received in the wall 27 of the bore 21, radially towards the center of the bore 21. Thus, the head portion 8 of the locking pin 7 is engaged from its lower side with the result that the locking pin 7 is held in the central bore 21 under bias and that the mounting plate 6 of the tool holder 2 is pressed against the freely exposed surface portion 9 of the coupling member 1. The locked condition as explained above is shown in FIG. 3 at the left side.

In order to release the tool holder 2 from the coupling member 1, pressurized air is pressed into the annular chamber 26 above the piston 22; consequently, the piston 22 is forced into its lowermost position as shown at the right side in FIG. 3, the balls 25 are free and the locking pin can be pulled out of the bore 21.

The connecting body 19 of the coupling member 1 has a base plate 28 provided with a central air supply connecting piece 29. The coupling member 1 may be mounted on the shaft 3 of the arm 5 of the robot by means of an annular clamping member 30. A plurality of electromagnetically operable air valves 31a–31g are mounted in a star-like arrangement on the base plate 28 around the connecting piece 29. In the example shown in FIG. 2, the following valves are provided: two valves 31a and 31b to control the supply of pressurized air having a first, reduced pressure; two valves 31c and 31d to control the supply of pressurized air having a second, higher pressure; two valves 31e and 31f to control the locking mechanism of the tool holder 2; one valve 31g to control the supply of air under vacuum.

The inlets of the valves 31c, 31d, 31e, 31f are connected to the main air supply, i.e. to the connecting piece 29, for instance as shown in FIG. 3 for the valve 31e, by means of radially extending channels 32 and axially extending channels 33. The outlets of the valves 31e and 31f are connected to the annular chamber 26 by means of axially extending channels 34, and the outlets of the valves 31c and 31d communicate with air channels 36 via axially extending channels 35 which run through the base plate 28. The air channels 36 extend through the entire coupling body to its freely exposed surface portion 9 and merge thereinto. Preferably, an O-ring 37 is provided for sealing purposes if the tool holder 2 is mounted.

Figure 5:
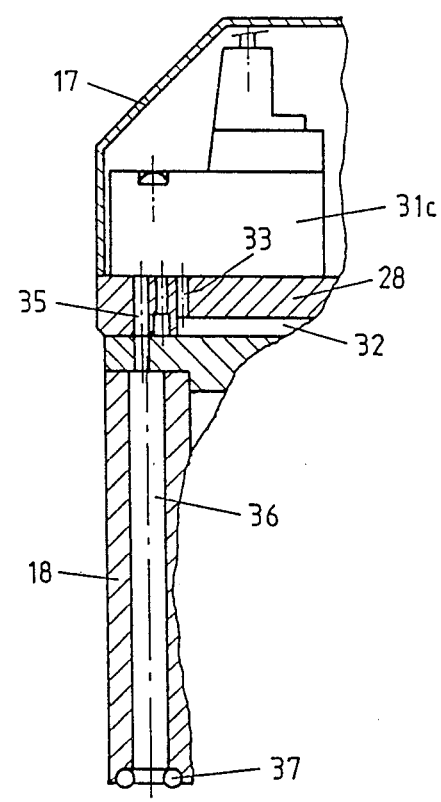
FIG. 5 is a sectional view along the line V—V in FIG. 2.

The inlets of the valves 31a and 31b communicate with a separate air supply connecting piece 38 to which pressurized air with a lower pressure is supplied by means of a (not shown) pipe. The outlets of the valves 31a and 31b are connected to the freely exposed surface portion 9 of the coupling member 1 by means of similar air channels (not shown) as explained in connection with the corresponding air channels 35 and 36 connected to the outlet of the valve 31c. Finally, the inlet of the valve 31g is connected to a connecting piece 39 which receives a (not shown) vacuum pipe. The outlet of the valve 31g is connected to the freely exposed surface portion 9 via similar channels 35 and 36, as shown in FIG. 5.

Further, the coupling member 1 is provided with a plurality of electric contact members 11 as already mentioned. Two contact pins 11a and 11b extend in axial direction between the valves 31b and 31c, to contact pins 11c and 11d extend between the valves 31d and 31e and two contact pins 11e and 11f extend between the valves 31f and 31g, run through the base plate 28 and through the coupling body 18 and end in the region of the freely exposed surface portion 9. All the contact pins are received each in an insulating sleeve 42 and comprise an upper, immovable portion 44 connected to a terminal 41 as well as a lower, axially movable portion 45 merging into the real contact pin member 11; a spring is inserted between the upper portion 44 and the lower portion 45 to urge the lower portion 45 into its lowermost position.

Finally, the coupling member 1 is provided with a centering member 46 which is located in the center of the freely exposed surface portion 9 of the coupling member 1 around the central bore 21. As can be seen from FIG. 3, the coupling body 18 is provided with an annular recess in which the centering member 46 is received. In the example shown in the drawings, the centering member 46 is equipped with four centering pins 47 which are symmetrically located with respect to the central longitudinal axis of the coupling member 1 and which project over the surface portion 9 by a certain amount; each of the centering pins 47 comprises a conically tapered head portion 48. The centering pins 47 cooperate with the centering disc 13 mounted on the plate 6 of the tool holder 2, as will be explained in more detail hereinafter.

It is quite evident from the above description and the drawings that the coupling member 1 is constituted by a compact unit, one side thereof being mounted on the end of the arm 5 of a robot whereby the main supply of pressurized air is directly effected through the robot arm via air channel 4 and shaft 3. All additional pneumatic and electric connections are concentrated in a connecting tube 49 (FIG. 1). On the other side, the coupling member offers a freely exposed surface portion 9 incorporating freely accessible pneumatic and electric connecting points as well as the centering member 46 and the central bore 21 to receive the locking pin 7.

Figure 6:
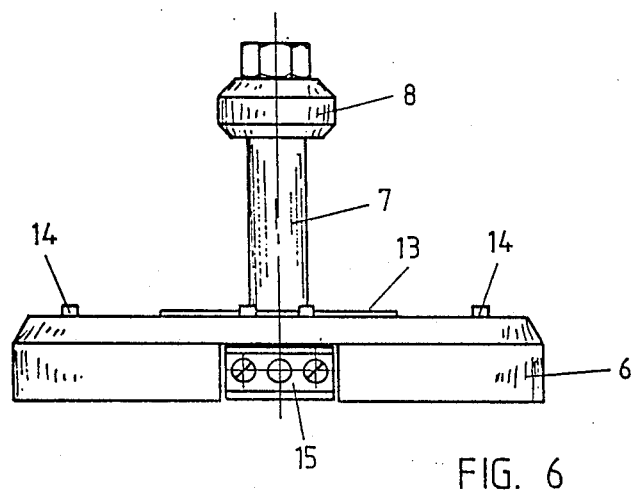
FIG. 6 is a side view of the tool holder.
Figure 7:
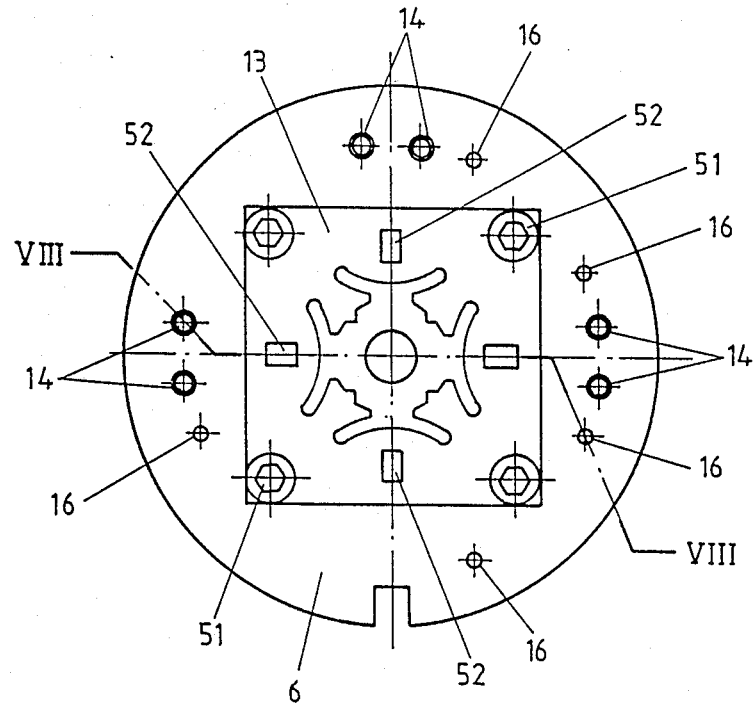
FIG. 7 is a top view of the tool holder.
Figure 8:
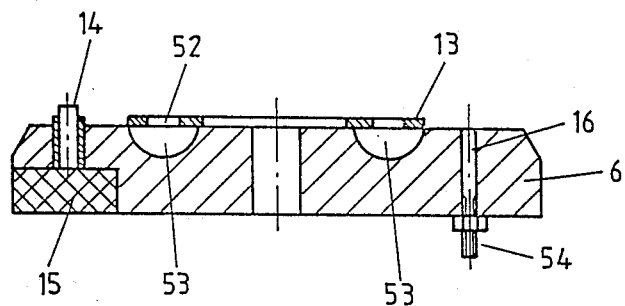
FIG. 8 is a sectional view of the tool holder along the line VIII—VIII in FIG. 7.

As can be seen from FIGS. 6 to 8, the mounting plate 6 comprises a centering disc 13 which is fixed to the plate 6, e.g. by means of screws 51, in such a way that it cannot be rotated with respect to the mounting plate 6. The centering disc 13 is rigid in circumferential direction. Preferably, the centering disc 13 consists of spring steel and is equipped with a plurality of centering apertures 52 which correspond to the centering pins 47 as far as their size, shape and location is concerned. If the tool holder 2 is mounted on the coupling member 1, the head portion 8 of the locking pins 7 is drawn into the central bore 21 under the influence of the the balls 25 and the centering pins 47 enter the centering apertures 52 such that the conically tapered head portions 48 of the centering pins 47 are at least partially engaged by the edges of the centering apertures 52. Thereby, the centering disc 13 is resiliently deformed in axial direction. For this purpose, the mounting plate 6 comprises recesses 53 located below the centering apertures 52. Thus, an extremely rigid positioning of the mounting plate 6 with respect to the coupling member 1 is ensured whereby the positional accuracy is not impaired even if the centering pins 47 are worn out or if the locking pin 7 has a considerable clearance in the central bore 21.

The mounting plate 6 comprises air channels 16 and electric contacts 14. The position of the channels 16 corresponds to the position of the channels 36 in the coupling member 1, and the position of the contacts 14 corresponds to the position of the contacts 11 in the coupling member 1. Preferably, the channels 16 are provided with connecting pieces 54 at the free surface of the mounting plate 6 in order to facilitate the establishing of the required pneumatic connections to a pneumatically operated tool received on the mounting plate 6. Correspondingly, the electric contacts 14 are in connection with terminals 15 to enable electric connections to be made to an electrically operated tool.

The proposed apparatus as hereinbefore described as a preferred embodiment offers the possibility to provide a plurality of pre-mounted tools, each mounted on a tool holder 2, whereby all required pneumatic and electric connections between tool holder 2 and tool are already established. If a thus prepared tool holder 2 is inserted into the coupling member 1, these pneumatic and electric connections to the coupling member 1 and thereby to the control unit of the robot are closed since the mounting plate 6 of the tool holder 2 fittingly rests on the surface portion 9 of the coupling member 1 as soon as the tool holder 2 is locked in the coupling member 1. Consequently, a fully automatic tool exchange without the assistance of an operator is possible.

The centering by means of the centering pins 47 and the centering disc 13 offers the desired high precision in the range of +/− 0.01 mm; particularly, a very high repetitive position accuracy, an insensitivity against wear and contamination as well as constructional simplicity are guaranteed. Thus, a continuous operation over a long period of time, even if the tools have to be frequently changed in short intervals, is possible without any problems.

In the embodiment hereinbefore described, seven valves, six electric connections and five pneumatic connections are provided; this should be sufficient for the plurality of tools which may be used with a manipulation device. The apparatus according to the invention may therefore be universally used. However, it is understood that more or less electric and/or pneumatic connections can be provided if required.

What I claim is:

1. An apparatus for detachably connecting a tool to a manipulating device, comprising a tool holder and a coupling member mounted on the manipulating device, said tool holder and said coupling member each including locking means to detachably connect said tool holder to said coupling device by a positive interlocking, said coupling member comprising a freely exposed frontal surface on which said tool holder rests upon connecting thereof to said coupling member, said coupling member further comprising a plurality of channels merging into said freely exposed frontal surface and a plurality of electric contact members, the ends thereof being located in the region of said freely exposed frontal surface, said coupling member further comprising a plurality of centering pins projecting beyond said freely exposed frontal surface and having a conically tapered point portion, said centering pins being located adjacent to said freely exposed frontal surface, said tool holder comprising a surface portion adapted to rest on said freely exposed frontal surface of said coupling member upon connecting said tool holder to said coupling member by means of said locking means, said surface portion of said tool holder being equipped with a plurality of channels correspondingly located with respect to said channels in said coupling member and a plurality of electric contacts correspondingly arranged with respect to said electric contact members provided in said coupling member, said tool holder further comprising a disc-shaped centering member mounted on said surface portion and being axially resilient but rigid in circumferential direction, said centering member having a plurality of apertures correspondingly located with respect to said centering pins and at least partially engaging the conically tapered point portion of said centering pins upon connecting said tool holder to said coupling member.

2. An apparatus according to claim 1, in which said coupling member further comprises a plurality of electromagnetic valves, each of said electromagnetic valves being associated with one of said plurality of said channels in said coupling member.

3. An apparatus according to claim 2, in which the inlet of at least some of said electromagnetic valves is connected to a first source of pressurized air.

4. An apparatus according to claim 2, in which the inlet of at least one of said electromagnetic valves is connected to a second source of pressurized air.

5. An apparatus according to claim 2, in which the inlet of at least one of said electromagnetic valves is connected to a vacuum source.

6. An apparatus according to claim 1, in which said electric contact members of said coupling member comprise axially resiliently mounted pins, the tips thereof slightly standing back with respect to said freely exposed frontal surface of said coupling member.

7. An apparatus according to claim 1, in which said electric contacts of said tool holder project beyond said surface portion of said tool holder adapted to rest on said freely exposed frontal surface of said coupling member.

8. An apparatus according to claim 1, in which said coupling member comprises four centering pins symmetrically located on a portion of the frontal surface of the coupling member which stands back with respect to said freely exposed frontal surface of said coupling member.

9. An apparatus according to claim 1, in which said tool holder comprises a plate-shaped body which is symmetric with respect to the central axis of the apparatus, said plurality of channels and said plurality of electric contacts being located along the periphery of said plate-shaped body, said disc-shaped centering member being centrally mounted on said plate-shaped body.

10. An apparatus according to claim 9, in which said plate-shaped body of said tool holder comprises a plurality of recesses in its surface which are congruently located with respect to said apertures in said disc-shaped centering member.

* * * * *